United States Patent [19]

Preziosi et al.

[11] 4,220,747

[45] Sep. 2, 1980

[54] CRYSTALLINE DIACETYLENE POLYMERS

[75] Inventors: Anthony F. Preziosi, Ledgewood; Kwok C. Yee, Randolph; Ray H. Baughman, Morris Plains, all of N.J.

[73] Assignee: Allied Chemical Corporation, Morris Township, N.J.

[21] Appl. No.: 700,626

[22] Filed: Jun. 28, 1976

Related U.S. Application Data

[63] Continuation-in-part of Ser. No. 578,246, May 16, 1975, abandoned.

[51] Int. Cl.² .................................................. C08F 38/00
[52] U.S. Cl. .................................... 526/285; 560/24; 560/28; 560/33; 560/157; 560/166
[58] Field of Search ............ 526/285; 260/678, 632 Y, 260/635 Y, 482 B, 482 C, 77.5 R

[56] References Cited

PUBLICATIONS

Wegner, Die Makromolekulare Chemie, vol. 154, pp. 35–48, 1972.

Primary Examiner—Paul R. Michl
Attorney, Agent, or Firm—Robert A. Harma

[57] ABSTRACT

Liquid phase processable crystalline diacetylene polymers are obtained by the solid state reaction of monomers having the formula

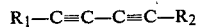

$$R_1-C\equiv C-C\equiv C-R_2$$

where $R_1$ and $R_2$ are independently selected from the group consisting of
(a) $CH_3(CH_2)_m-$
(b) $HO(CH_2)_n-$ and
(c) $R_3NHOCO(CH_2)_p-$
where "m" is an integer of from 0 to 15, "n" is an integer of from 1 to 15, "p" is an integer of from 1 to 15, and $R_3$ is a member selected from the group consisting of
(i) $C_6H_5(CH_2)_r-$
(ii) $CH_3(CH_2)_r-$ and
(iii) $C_{10}H_7(CH_2)_r-$
where "r" is an integer of from 0 to 11; with the proviso that where $R_1$ and $R_2$ are the same and are either (b) or (c), neither "n" nor "p" equals 1; and with the further proviso that where $R_1$ and $R_2$ are different and are either (b) or (c), the sum of "n" plus "p" is greater than 2.

Polymerization proceeds by 1,4-addition reaction at each diacetylene group to produce a crystalline diacetylene polymer having the structure

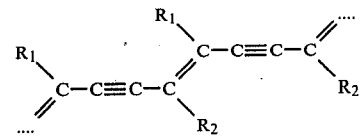

or the alternate head-to-head structure:

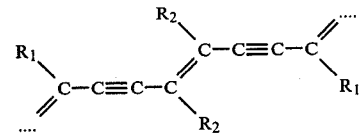

where $R_1$ and $R_2$ are as defined above. The structure of such polymers is characterized by Raman intense $\nu_{C=C}$ and $\nu_{C\equiv C}$ vibrations at, respectively 1450 to 1540 cm$^{-1}$ and 2060 to 2140 cm$^{-1}$, which replace the Raman intense $\nu_{C\equiv C}$ vibration at approximately 2260 cm$^{-1}$ in the monomer. The polymers are further characterized by intense optical dichroism, which is indicative of a high degree of chain alignment, and by high thermal dimensional stability. They are useful as photoconductive materials, pigments, high strength materials, and optical polarizers.

7 Claims, No Drawings

CRYSTALLINE DIACETYLENE POLYMERS

This is a continuation-in-part of application Ser. No. 578,246, filed May 16, 1975, and now abandoned.

BACKGROUND OF THE INVENTION

Dramatic differences are found between the physical properties of linear polymers with single crystalline and either multiphase or amorphous structures. As a result of the gross structural defects characteristic of conventional polymers, structure-sensitive properties are largely determined by interphase regions and/or defects associated with conformational irregularity within phases. Only for extended-chain single crystals with high structural perfection is it possible to realize in bulk properties the unique chain-direction properties of the individual polymer molecules.

Solid state polymerization is as present the only known method for obtaining organic polymer single crystals with a length on the order of a centimeter or larger. In particular, the solid state reaction of certain diacetylene phases results in polymer crystals with dimensions as large as the precursor diacetylene phases. These polymers have high strength, high elastic modulus and high creep resistance. They evidence both semiconductive and photoconductive properties.

In the prior art, a limited number of diacetylenes have been successfully polymerized by solid state reaction. Examples of diacetylenes and of the techniques employed in solid state polymerization are disclosed by G. Wegner in Vol. 24, *Zeitschrift fur Naturforschung*, pp. 824–832 (1969) and in Vol. 154, *Die Makromolekulare Chemie*, pp. 35–48 (1972). Diacetylene monomers which have previously been polymerized by solid state polymerization include 2,4-hexadiyne-1,6-diol-bisphenylurethane; 2,4-hexadiyne-1,6-diol-bis-α-naphthylurethane; and 2,4-hexadiyne-1,6-diol-bisbutylurethane. These polymers, however, are neither melt nor solution processable, and thus, cannot be fabricated into usable forms.

SUMMARY OF THE INVENTION

According to the present invention, liquid phase processable crystalline diacetylene polymers are provided by 1,4-addition solid state reaction of the corresponding monomers (I) below, in which polymerization results from thermal annealing, exposure to actinic radiation, the application of mechanical stress, or a combination thereof. The diacetylene monomers of the present invention are members selected from the group consisting of monomers having the formula (I)

where $R_1$ and $R_2$ are independently selected from the group consisting of
 (a) $CH_3(CH_2)_m$—
 (b) $HO(CH_2)_n$— and
 (c) $R_3NHOCO(CH_2)_p$—
where "m" is an integer of from 0 to 15, "n" is an integer of from 1 to 15, "p" is an integer of from 1 to 15, and $R_3$ is a member selected from the group consisting of
 (i) $C_6H_5(CH_2)_r$—
 (ii) $CH_3(CH_2)_r$— and
 (iii) $C_{10}H_7(CH_2)_r$—
where "r" is an integer of from 0 to 11; with the proviso that where $R_1$ and $R_2$ are the same and are either (b) or (c), neither "n" nor "p" equals 1; and with the further proviso that where $R_1$ and $R_2$ are different and are either (b) or (c), the sum of "n" plus "p" is greater than 2.

The polydiacetylenes of the present invention are fully conjugated, linear polymers and consist of parallel, unfolded chains, thereby resulting in high strength, high modulus, high creep resistance and high optical dichroism. Highly chain-aligned single crystals of these polymers can be obtained with dimensions which are as large as are obtainable for the precursor monomer crystals—so they are readily obtainable either as boules about 1 cm² in cross section and over 15 cm long or as fibers with comparable lengths. Also, the polydiacetylenes of the present invention exhibit high thermal dimensional stability and therefore find utility as materials of construction in devices (e.g., optical measuring devices) in which dimensional changes resulting from mechanical stress or temperature changes must be minimized.

Since the polymers of the present invention have high strength, especially high tensile strength, they are eminently suitable for incorporation into composite structures to impart high strength thereto. Moreover, for crystalline phases in which neighboring monomer molecules are suitably related for reactivity, the initially colorless monomer crystals rapidly become brilliantly colored upon thermal annealing or upon exposure to actinic irradiation. Thus, the crystalline monomers of the present invention may also be used in photographic applications as a photosensitive material. Similarly, because of the intense coloration of these polymers, they are suitable for use as pigments. In addition, since the polydiacetylenes of the present invention have been found to exhibit strong dichroism, they can be used as the active component of a polarizing device for optical applications.

The polymers of the present invention are generally crystalline in the sense that they possess three-dimensional periodicity. Lacking this, the polymers of the present invention are crystalline in the sense of preserving at least one degree of structural periodicity, as in a nematic phase liquid crystal. In all cases, the polymer chains are parallel in the as-polymerized phase, as evidenced by the intense optical dichroism which is observed. Consequently, there is a unique chain direction which is coincident for all polymer chains, with corresponding property enhancement in this direction.

DETAILED DESCRIPTION OF THE PRESENT INVENTION

In accordance with the present invention, there are provided liquid phase processable crystalline diacetylene polymers having the formula (I)

where $R_1$ and $R_2$ are independently selected from the group consisting of
 (a) $CH_3(CH_2)_m$—
 (b) $HO(CH_2)_n$— and
 (c) $R_3NHOCO(CH_2)_p$—
where "m" is an integer of from 0 to 15, "n" is an integer of from 1 to 15, "p" is an integer of from 1 to 15 and $R_3$ is a member selected from the group consisting of
 (i) $C_6H_5(CH_2)_r$—
 (ii) $CH_3(CH_2)_r$— and
 (iii) $C_{10}H_7(CH_2)_r$— where "r" is an integer of from 0 to 11, with the proviso that when $R_1$ and $R_2$ are the same and are either (b) or (c), neither "n" nor "p" equals 1; and with the further priviso that when $R_1$ and $R_2$ are different and are either (b) or (c), the sum of "n" plus "p" is greater than 2.

"Liquid phase processable" is used to include melt processing, solution processing and the like. A number of melt and solution processing techniques may be employed involving the polymers of the invention. These include temperature-pressure processing of the polymers and solvent casting of the polymers.

In melt processing of polymers, the polymers of the invention are pressed into films by a heated hydraulic press. Typically, forces of about 10 to 15 tons, maintained for about 2½ to 3 minutes, are employed. The press is heated to a temperature slightly above the softening point of the polymer. The resultant films are typically pliable, strong and have metallic-appearing surfaces.

In solvent casting, films are cast from polymers of the invention. The polymer is typically dissolved in a polar, hot solvent such as dimethylsulfoxide. After filtration, the solution is poured onto the surface of an open container. The solution is heated, for example, to about 65° to 75° C., to evaporate the solvent. Upon evaporation, a film forms which is pliable and strong, often with metallic-appearing surfaces.

A greater processability of the polymer of the liquid phase is obtained where the total number of methylene groups ($—CH_2—$) in the monomer associated with the acetylene functionality is at least 6; that is, where the sum of "m" plus "n" plus "p" is at least 6. A greater processability means a greater ease of formation from melt or solution phases of polymer films with useful properties. Accordingly, such polymers are preferred.

The diacetylene polymers may have the structure (IIa):

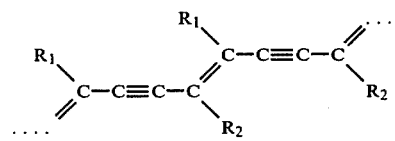

or the alternate head-to-head structure (IIb):

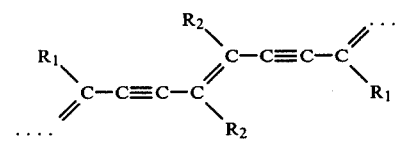

where $R_1$ and $R_2$ are as previously defined.

Although the polymer structure depicted above (e.g., IIa) best explains the experimental data obtained, there appears to be some resonance contribution from the mesomeric butatriene structure (IIIa):

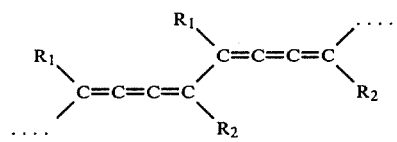

where $R_1$ and $R_2$ are as previously defined.

Examples of monomeric diacetylenes that may be employed in the practice of the invention include:

(1) $CH_3—C≡C—C≡C—CH_2OCONHC_6H_5$
  2,4-hexadiyne-1-ol-phenylurethane
(2) $CH_3—C≡C—C≡CH_2OCONHCH_2CH_3$
  2,4-hexadiyne-1-ol-ethylurethane
(3) $CH_3—C≡C—C≡C—CH_2OCONHCH_3$
  2,4-hexadiyne-1-ol-methylurethane
(4) $CH_3CH_2NHOCO(CH_2)_2—C≡C—C≡C—(CH_2)_2OCONHCH_2CH_3$
  3,5-octadiyne-1,8-diol-bisethylurethane
(5) $CH_3NHOCO(CH_2)_2—C≡C—C≡C—(CH_2)_2OCONHCH_3$
  3,5-octadiyne-1,8-diol-bismethylurethane
(6) $C_{10}H_7NHOCO(CH_2)_2—C≡C—C≡C—(CH_2)_2OCONHC_{10}H_7$
  3,5-octadiyne-1,8-diol-bisnaphthylurethane
(7) $C_6H_5NHOCO(CH_2)_3—C≡C—C≡C—(CH_2)_3OCONHC_6H_5$
  4,6-decadiyne-1,10-diol-bisphenylurethane
(8) $CH_3NHOCO(CH_2)_3—C≡C—C≡C—(CH_2)_3OCONHCH_3$
  4,6-decadiyne-1,10-diol-bismethylurethane
(9) $C_{10}H_7NHOCO(CH_2)_3—C≡C—C≡C—(CH_2)_3OCONHC_{10}H_7$
  4,6-decadiyne-1,10-diol-bisnaphthylurethane
(10) $CH_3CH_2NHOCO(CH_2)_4—C≡C—C≡C—(CH_2)_4OCONHCH_2CH_3$
  5,7-dodecadiyne-1,12-diol-bisethylurethane
(11) $C_6H_5NHOCO(CH_2)_4—C≡C—C≡C—(CH_2)_4OCONHC_6H_5$
  5,7-dodecadiyne-1,12-diol-bisphenylurethane
(12) $C_{10}H_7NHOCO(CH_2)_4—C≡C—C≡C—(CH_2)_4OCONHC_{10}H_7$
  5,7-dodecadiyne-1,12-diol-bisnaphthylurethane
(13) $CH_3NHOCO(CH_2)_4—C≡C—C≡C—(CH_2)_4OCONHCH_3$
  5,7-dodecadiyne-1,12-diol-bismethylurethane
(14) $C_6H_5NHOCO(CH_2)_2—C≡C—C≡C—(CH_2)_2OCONHC_6H_5$
  3,5-octadiyne-1,8-diol-bisphenylurethane The solid-state polymerized diacetylenes already known in the prior art are infusible and are generally either insoluble or soluble only with great difficulty; see G. wegner, Vol. 154, *Die Makromoleculare Chemie*, pp. 35-48 (1972). In contrast, the polymers of the present invention are liquid phase processable; that is, they are either melt processable, solution processable or both. This aspect is of considerable importance for fabricating the polydiacetylenes into usable forms, such as films suitable for photoconductive applications. Similarly of importance for obtaining the polydiacetylenes in usable forms, the precursor monomeric compositions employed in the invention can be grown from the melt phase as single crystal boules of large dimensions, weighing at least about 1 g. For example, crystals longer than about 20 cm and having a diameter greater than about 1.0 cm can be grown from the melt. Solid-state polymerization then transforms these melt-grown monomer boules into polymer boules of nearly the same dimension. This aspect provides a more convenient means of fabricating polymer single crystals with specific dimensions than does solution growth. In contrast, the melt growth of large crystals of precursor monomers of prior art polydiacetylenes has not been successful.

In order to obtain the polymers of the present invention, and in particular to obtain these polymers in high yields as single crystals, it is necessary to obtain precursor crystal phases with suitable molecular packing. For the crystalline polymers of the present invention to be obtained by solid state polymerization, the mutually reacting diacetylene groups in neighboring monomer molecules are usually, though not necessarily, related by a unit cell translation. In order for the monomer phase to be polymerizable, there must exist neighboring monomer molecules which are separated by a center-to-center vector which is in the range of 3.8 to 8.3 A and preferably in the range 4.4 to 6.8 A. Furthermore, in order to obtain significant solid state polymerizability, the inclination of the rods of the diacetylene groups in these neighboring molecules with respect to this vector must be in the range 24° to 65°, and preferably in the range of 30° to 51°.

Monomer phases with suitable structures for solid state polymerizability are obtained either by crystallization from the corresponding melt, by crystallization from suitable solvents, such as for example, chloroform, methanol, ethanol, acetone, dioxane, water, petroleum ether, n-hexane, n-heptane and 1,2-dimethoxyethane, or by sublimation.

The monomers of formula (I) suitable for making the polymers of the present invention may be prepared by known methods. For example, the mono- and bis-urethane derivatives may be prepared by reacting the corresponding diyne-ol or diyne-diol with an isocyanate having the formula $R_3NCO$, where $R_3$ is as defined above. Thus, 2,4-hexadiyne-1-ol-methyl-urethane may be prepared by reacting 1-hydroxy-2,4-hexadiyne with methylisocyanate, and 3,5-octadiyne-1,8-diol-bis-$\alpha$-naphthyl-urethane may be prepared by reacting 3,5-octadiyne-1,8-diol with $\alpha$-naphthylisocyanate. A catalyst may be added to the reaction mixture to increase the reaction rate to produce the desired diacetylene monomer. Conventional tin catalysts (e.g., dibutyltin-di-2-ethylhexanoate) and tertiary amines (e.g., triethylamine) may be used as catalysts. The reaction mixture may also be warmed, as for example to about 45° to 55° C., to speed up the reaction, which is moderately exothermic. Such heating, however, is not required. The desired diyne-ol or diyne-diol may also be prepared by conventional methods. Thus, for example, 4,6-decadiyne-1,10-diol may be produced by the oxidative coupling of the corresponding alkyne, i.e., 4-pentyne-1-ol.

Following preparation of the desired monomer, it must be crystallized from an appropriate solvent, from the melt, or from the vapor, so as to provide a monomer crystal phase which is polymerizable and preferably to provide a monomer crystal phase which will undergo substantially quantitative polymerization. Suitable solvents include alkyl esters of monocarboxylic acids, alkyl alcohols, paraffins, olefins, benzene, alkylated benzenes, ethers, ketones, petroleum ether, halogenated hydrocarbons, and water. Examples of suitable solvents include ethylacetate, methyl propionate, methanol, ethanol, butanol, isopropanol, hexane, heptane, 1,4-dimethylheptane, toluene, xylene, trimethylbenzene, ethyl ether, isopropyl ether, 1,2-dimethoxyethane, tetrahydrofuran, dioxane, acetone, ethylmethyl ketone, chloroform, dichloromethane and trichloroethane, and mixtures thereof. Especially preferred as crystallizing solvents are 1,2-dimethoxyethane, dioxane, tetrahydrofuran, petroleum ether, acetone, chloroform, benzene, methanol, ethanol, xylene, ethylacetate and water. Crystallization may, for example, be effected by room temperature evaporation of solutions containing from 0.0001 to 0.5, and preferably about 0.002 to 0.2, part by weight of monomer per part by weight of solvent or solvent blend. Alternatively, other conventional recrystallization procedures may be used, such as by sublimation or by cooling a saturated solution to a sufficiently low temperature (usually at or above room temperature) that the required crystallization occurs.

Similarly, suitable crystals of a selected diacetylene monomer are grown from the melt by any of the usual crystal growing methods, e.g., the Czochroalski technique, as described by J. Czochralski, Vol. 92, *Zeitschrift fur Physikalische Chemie*, pp. 219–221 (1918) or by K. Nassau and L. G. Van Uitert, Vol. 31, *Journal of Applied Physics*, p. 1508 (1960).

The polymers of the present invention are obtained via 1,4-addition solid state polymerization by subjecting the monomeric crystals to actinic radiation, heat or mechanical stress. When the monomer crystals are polymerized by heat, or thermal annealing, a temperature below the melting point of the polymerizing crystals is employed. Typically the temperature ranges from about 20° to 200° C., and preferably from about 70° to 150° C. Although the temperature of annealing is not critical so long as the melting point of the polymerizing phase is not exceeded and may vary widely, temperatures greater than about 200° C. tend to result in decomposition of the polymer itself, and use of a temperature less than about 20° C. usually does not result in polymerization at a beneficial rate. As examples of actinic radiation, the monomeric crystals may be exposed to short wavelength visible or ultraviolet radiation, e.g. as generated by a 100-watt high pressure mercury lamp. However, in most cases the monomer is not easily polymerizable using visible radiation, so that shorter wavelength radiation is preferably employed. Gamma-radiation may also be employed, e.g., as emitted by $^{60}Co$ source. Where $\gamma$-radiation is utilized, the dosage of radiation may vary widely, and dosages of from 1 to 100 Mrad have been employed, although higher and lower levels can be used as well.

For monomers having a lower number of methylene groups ($—CH_2—$), a greater processability in melt or solution phases is obtained by employing lower $\gamma$-radiation dosages. For example, reference to the subscripts "m", "n" and "p" of the monomers of formula (I), where the total number of methylene groups associated with the acetylene functionality is 2, then a dosage of about 1 to 5 Mrad is desirably employed. Where the total number of methylene groups is 6, then a dosage of about 15 to 25 Mrad is desirably employed.

The resultant polymers are usually insoluble in common organic solvents, other than hot, polar solvents, and have practically the same shape as the precursor monomer crystals. They are strongly dichroic, with the axis of the dichroism substantially parallel with a rapid growth direction of the monomer phase, indicating that the fully conjugated chains of the polymer are highly aligned, an aspect which is important for optimization of properties. Their infrared spectra are essentially identical to those of the monomer, indicating that the polymers possess the same functionality as the monomer. Raman spectral evidence indicates that 1,4-addition reaction has occurred at the diacetylene group within the monomer molecule. The Raman intense vibration at about 2260 cm$^{-1}$ ($\nu_{C\equiv C}$), which is characteristic of the diacetylene functionality of the monomer, disappears and is replaced by Raman intense vibrations between 1450 and 1540 cm$^{-1}$ ($\nu_{C=C}$) and between 2060 and 2140 cm$^{-1}$ ($\nu_{C\equiv C}$) in the polymer. X-ray diffraction data indicate that the repeat dimension in the chain direction is approximately 4.9 Å (or a multiple thereof), which confirms the spectral evidence that the polymerization has proceeded by a 1,4-addition reaction.

Since the polymers are usually insoluble in most common organic solvents, the polymer is easily recovered from the monomer by washing the polymer with a suitable solvent to extract any non-polymerized monomer. Suitable solvents include alcohols, preferably methanol, and ketones, preferably acetone.

Preparation of the diacetylene polymers of the present invention may be further illustrated by reference to the following examples:

EXAMPLE 1

Preparation of poly-2,4-hexadiyne-1-ol-ethylurethane

A 100 ml 3-necked round bottom flask fitted with a mechanical stirrer, thermometer, nitrogen bubbler (inlet and outlet), addition funnel and reflux condenser was purged with nitrogen, and a solution of 4.0 g (0.043 mole) of 1-hydroxy-2,4-hexadiyne in 100 ml of tetrahydrofuran, was added to the flask. The resulting solution was stirred, and 17.6 g (0.25 mole) of ethyl isocyanate was added dropwise. After a period of 15 min, 0.1 g of dibutyl-tin-di-2-ethylhexanoate and 2 ml of triethylamine were added to the above mixture as catalyst. The foregoing mixture was stirred for a period of 2 hr at 25° C.

At the end of the above period, 75 ml of heptane was added to the solution. No precipitation was observed to occur. Then, nitrogen was rapidly bubbled through the solution and the reaction mass was heated to a temperature of 70° C. to remove the excess isocyanate and tetrahydrofuran, resulting in the formation of a precipitate. The solids were collected by filtration and washed with three 50 ml portions of heptane, yielding 2.8 g of crude material. The filtrate was concentrated and dried, resulting in another 1.3 g of solid monomer. Thus, a total of 4.1 g (58% yield) of monomer (melting point 54.0° to 56.1° C.) was obtained.

Upon analysis, the solid monomer was characterized as follows:

$^1$H nmr (CDCl$_3$/TMS) $\delta$7.1 (s,N-H), 4.7 (quartet, CH$_2$—$_O$), 3.0 (m, CH$_2$—$_N$), 1.8 (t, CH$_3$—C≡C), 1.0 (t, CH$_3$—$_C-N$).

In a separate run, the above procedure was repeated employing 5.2 g (0.055 mole) of 1-hydroxy-2,4-hexadiyne, 7.1 g (0.1 mole) of ethyl isocyanate, 2 ml of triethylamine, 0.1 g of dibutyltin-di-2-ethylhexanoate and 100 ml of tetrahydrofuran. After a reaction time of about 2 hr, 400 ml of heptane was added as above. Since no precipitate was observed, the reaction mixture was heated to 70° C. to remove excess isocyanate. The mixture was then evaporated over a period of 12 hours, resulting in the formation of 9.0 g (99% yield) of needle-shaped crystals of monomer, which were about 10 mm in length. Separate 0.5 g samples of these crystals were exposed to selected dosages of γ-radiation at a dose rate of 1 Mrad/hr, resulting in the formation of the desired polymeric diacetylene (poly-2,4-hexadiyne-1-ol-ethylurethane). Each irradiated sample was washed with methanol to extract any non-polymerized monomer from the mass, yielding a dark blue polymer in the amounts indicated in Table I below:

TABLE I

| | Radiation Dosage (Mrad) | | | | |
|---|---|---|---|---|---|
| | 1 | 5 | 25 | 50 | 100 |
| Polymer Conversion (Wt. % of irradiated sample polymerized) | 19 | 27 | 31 | 29 | 37 |

The polymer fibers from which the monomer had been extracted with highly dichroic, with the axis of dichroism coincident with the fiber direction. Although the polymer chains were parallel, X-ray diffraction measurements indicated that the projection of the polymer structure down the chain axis direction was not periodic. Consequently, the structure of this polymer was analogous to a conventional nematic phase liquid crystal.

EXAMPLE 2

Preparation of poly-2,4-hexadiyne-1-ol-methylurethane

Following the procedure set forth in Example 1, 0.94 g (0.01 mole) of 1-hydroxy-2,4-hexadiyne, together with 60 ml of tetrahydrofuran, was added to the flask under a nitrogen atmosphere. The mixture was heated to a temperature of 50° C., and 0.55 g (0.012 mole) of methyl isocyanate was added to the mixture dropwise over a period of 5 min with continuous stirring. A mixture of 0.15 g of dibutyltin-di-2-ethylhexanoate and 2.5 ml of triethylamine was then added, and the resulting mixture stirred for a period of 2 hr and maintained at a temperature of about 50° C. Following this period, 500 ml of heptane was added, and the resulting precipitate was collected by filtration and washed with heptane. The resulting white fluffy solids were crystallized from a 90:10 dioxane/water solution, forming clear needles having a length of about 2.5 cm and a melting point of about 81.8° to 83.0° C.

Exposure of these colorless needles to ultraviolet light caused the needles to turn pink after about 8 hr exposure, indicating polymerization of at least a portion of the monomer to poly-2,4-hexadiyne-1-ol-methylurethane.

EXAMPLE 3

Preparation of poly-2,4-hexadiyne-1-ol-phenylurethane

Following the procedure of Example 1, 5.0 g (0.053 mole) of 1-hydroxy-2,4-hexadiyne and 16 ml (0.15 mole, 17.5 g) of phenylisocyanate were reacted in the presence of 0.2 g of dibutyltin-di-2-ethylhexanoate, 2 ml of triethylamine and 50 ml of tetrahydrofuran. The reaction was effected with constant stirring at a temperature of about 50° to 55° C. After a period of about 4 hr, heptane warmed to a temperature of about 45° to 50° C. was added to the reaction mixture, thereby producing a cloudy mixture. To enhance precipitation, nitrogen was bubbled through the vessel continuously to remove tetrahydrofuran, resulting in the formation of substantial quantities of precipitate. The solids were collected by filtration and washed with heptane. The solids were then dried and crystallized from xylene, resulting in monomer having a melting point of from 76.1° to 78.1° C.

The monomer was characterized as follows:

$^1$H nmr (CDCl$_3$/TMS) $\delta$ 7.3 (m, Ar—H), 6.8 (s, N—H), 4.7 (quartet, CH$_2$—O), 1.9 (t, CH$_3$).

Exposure of the monomer to 50 Mrad of γ-radiation caused the slightly yellow monomer to become red-brown in color.

EXAMPLE 4

Preparation of poly-3,5-octadiyne-1,8-diol-bismethylurethane

Following the procedure of Example 1, 13.0 g (0.094 mole) of 3,5-octadiyne-1,8-diol was reacted with 14.3 g (0.25 mole) of methyl isocyanate in the presence of 2.5 ml of triethylamine and 0.1 g of dibutyltin-di-2-ethylhexanoate in 150 ml of tetrahydrofuran. After about 2 hr of continuous stirring of the reactants, 500 ml of heptane was added to the reaction mixture and the reaction mixture was heated to about 70° to 80° C. to remove excess isocyanate. A precipitate formed, which was collected by filtration, washed with heptane and dried, resulting in 21.7 g (92% yield) of solid monomer (melting point 169.6° to 170.4° C.).

Flat needle-like crystal about 3 mm long were crystallized from a 60:40 methanol/water solution containing 0.044 g/ml of monomer by reducing the temperature from 56° C. to room temperature at a rate of 1.2° C./hr. Various solvents were employed in separate runs to recrystallize samples of the monomer crystals. The solvents employed were: chloroform, dichloroethylene, carbon tetrachloride, methanol, ethanol, ethylacetate, ethanol/water, ethylacetate/water and xylene.

The monomer crystals were characterized by subsequent analysis as follows:

$^1$H nmr (CDCl$_3$/TMS) δ 6.8 (s, N—H), 4.2 (t, CH$_2$—O), 2.7 (d, CH$_3$), 2.6 (t, CH$_2$—C≡C).

It was noted that when the initially colorless monomer crystals were exposed to ultraviolet radiation, they immediately became pink in color; when exposed to daylight, they turned purple. When exposed to 15 Mrad of γ-radiation from a $^{60}$Co source at a rate of 1 Mrad/hr, the monomer crystals turned dark red and were insoluble in acetone.

In separate runs, 0.5 g samples of the monomer crystals were subjected to selected degrees of γ-radiation at a dose rate of 1 Mrad/hr, resulting in an irradiated mass containing the desired polydiacetylene. Extraction of each such irradiated sample with methanol to remove any non-polymerized monomer therefrom yielded the data summarized in Table II below:

TABLE II

| | Radiation Dosage (Mrads) | | | | |
|---|---|---|---|---|---|
| | 1 | 5 | 25 | 50 | 100 |
| Polymer Conversion (Wt. % of irradiated sample polymerized) | 56 | 88 | 87 | 92 | 94 |

The polymer was characterized as follows:

(1) IR (KBr) 3320 cm$^{-1}$ (N—H stretching), 1690 cm$^{-1}$ (C═O), 1545 cm$^{-1}$ (N—H bending), 1270 cm$^{-1}$ (C—O—C).

(2) Raman $\nu_{C=C}$ at 1480 cm$^{-1}$, $\nu_{C\equiv C}$ at 2083 cm$^{-1}$.

EXAMPLE 5

Preparation of poly-3,5-octadiyne-1,8-diol-bisethylurethane

Following the procedure of Example 1, 13.0 g (0.094 mole) of 3,5-octadiyne-1,8-diol was reacted with 20.0 g (0.282 mole) of ethyl isocyanate in the presence of 2.5 ml of triethylamine, 0.1 g of dibutyltin-di-2-ethylhexanoate and 150 ml of tetrahydrofuran. After about 1 hr of continuous stirring, 500 ml of heptane was added to the reaction mixture and the resulting mixture was heated to a temperature of about 70° to 80° C. to remove excess isocyanate and to induce precipitation. The precipitate was collected by filtration and washed with heptane, resulting in 22.4 g (85% yield) of solid monomer (melting point 162.6° to 163.2° C.).

Sword-like crystals were formed from a hot 58:42 methanol/water solution containing 0.0043 g/ml of monomer by reducing the temperature from 56° C. to room temperature at a rate of 1.2° C./hr.

The monomeric crystals were characterized as follows:

(1) $^1$H nmr (CDCl$_3$/TMS) δ 5.0 (s, N—H), 4.2 (t, CH$_2$—O), 3.2 (m, CH$_2$—N), 2.6 (t, CH$_2$—C≡C), 1.2 (t, CH$_3$).

(2) IR (CHCl$_3$) 3460 cm$^{-1}$ (N—H stretching), 1720 cm$^{-1}$ (C═O), 1520 cm$^{-1}$ (N—H bending), 1230 cm$^{-1}$ (C—O—C).

The crystals turned pink upon exposure to daylight; upon exposure to irradiation by 15 Mrad of γ-radiation from a $^{60}$Co source, the crystals became a metallic gold color.

As in Example 4, 0.5 g samples of the above monomer crystals were subjected to selected dosages of γ-radiation to form an irradiated mass containing the desired polydiacetylene. Extraction of each irradiated sample with methanol gave the following data as summarized in Table III:

TABLE III

| | Radiation Dosage (Mrads) | | | | |
|---|---|---|---|---|---|
| | 1 | 5 | 25 | 50 | 100 |
| Polymer Conversion (Wt % of irradiated sample polymerized) | 6 | 30 | 55 | 61 | 59 |

The polymer thereby obtained was characterized as follows:

(1) IR (KBr) 3335 cm$^{-1}$ (N—H stretching), 1695 cm$^{-1}$ (C═O), 1540 cm$^{-1}$ (N—H bending), 1260 cm$^{-1}$ (C—O—C).

(2) Raman $\nu_{C=C}$ at 1487 cm$^{-1}$, $\nu_{C\equiv C}$ at 2095 cm$^{-1}$.

EXAMPLE 6

Preparation of poly-3,5-octadiyne-1,8-diol-bisphenylurethane

Following the procedure of Example 1, 6 g (0.0435 mole) of 3,5-octadiyne-1,8-diol was reacted with 27.0 g (0.226 mole) of phenyl isocyanate in the presence of 1 ml of triethylamine, 0.2 g of di-butyltin-di-2-ethylhexanoate and 75 ml of tetrahydrofuran. After a period of 3 hr of continuous stirring of the reaction mixture at a temperature of 50° C., 200 ml of heptane was added to the reaction mixture, resulting in a precipitate which was collected by filtration and washed with heptane. The solid monomer obtained was crystallized from 500 ml of ethanol, resulting in 11.7 g (72% yield) of monomer crystals (melting point 165.9° to 166.9° C.). Characterization of these monomer crystals yielded the following information:

$^1$H nmr (CDCl$_3$/TMS) δ 7.35 (m, Ar—H), 9.3 (s, N—H), 4.2 (t, CH$_2$—O), 2.7 (t, CH$_2$—C≡C).

Clear flat crystals about 4 mm long were obtained from a 83:17 methanol/water solution containing 0.0016 g/ml of monomer by slow evaporation at room temperature. The crystals were observed to become colored when exposed to light or to ultraviolet radiation. Exposure of the colorless monomer crystals to 50 Mrad of γ-radiation resulted in polymer crystals having a metallic gold color. The polymer was characterized by Raman $\nu_{C=C}$ at 1497 cm$^{-1}$, and $\nu_{C\equiv C}$ at 2098 cm$^{-1}$.

EXAMPLE 7

Preparation of poly-3,5-octadiyne-1,8-diol-bis-α-naphthylurethane

Following the procedure of Example 1, 1.5 g (0.011 mole) of 3,5-octadiyne-1,8-diol was reacted with 8.45 g (0.05 mole) of α-naphthyl isocyanate in the presence of 2 ml of triethylamine, 0.1 g of dibutyltin-di-2-ethylhexanoate and 75 ml of tetrahydrofuran. After 1 hr of continuous stirring, 400 ml of heptane was added to the reaction mixture, and the resulting precipitate was collected by filtration and washed with heptane. The monomer crystals were characterized as follows:

(1) $^1$H nmr (CDCl$_3$/TMS) δ 8.8 (s, N—H), 7.5 (m, Ar—H), 4.3 (t, CH$_2$—O), 2.7 (t, CH$_2$—C≡C).

(2) IR (CHCl$_3$) 3430 cm$^{-1}$ (N—H stretching), 1735 cm$^{-1}$ (C=O), 1600 cm$^{-1}$ (Ar C=C stretching), 1535 cm−1 (N—H bending).

Upon exposure of monomer crystals to 15 Mrad of γ-radiation, the initallly white solid became scarlet-red in color and was largely insoluble in hot acetone. The poly-3,4-octadiyne-1,8-diol-bis-α-naphthylurethane was characterized as follows:

(1) IR (KBr) 3280 cm$^{-1}$ (N—H stretching), 1700 cm$^{-1}$ (C=O), 1630+1600 cm$^{-1}$ (Ar C=C stretching), 1540 cm$^{-1}$ (N—H bending), 1200 cm$^{-1}$ (C—O—C), 780 cm$^{-1}$ (Ar—H bending).

(2) Raman $\nu_{C=C}$ at 1489 cm$^{-1}$, $\nu_{C\equiv C}$ at 2140 cm$^{-1}$.

EXAMPLE 8

Preparation of poly-4,6-decadiyne-1,10--diol-bismethylurethane

Following the procedure of Examples 1, 13.2 g (0.080 mole) of 4,6-decadiyne-1,10-diol was reacted with 15.9 g (0.27 mole of methyl isocyanate in the presence of 3 ml of triethylamine, 0.15 g of dibutyltin-di-2-ethylhexanoate and 150 ml of tetrahydrofuran. After the reaction mixture had been continuously stirred for a period of approximately 1 hr at a temperature of about 23° C., 500 ml of heptane was added and the resulting mixture heated to a temperature of 80° C. to remove excess isocyanate. A precipitate formed, which was collected by filtration and washed with heptane resulting in 19.7 g (88% yield) of solid (melting point 134.6° to 137.2° C.).

Flat thin plates up to 12 mm long by 1 mm wide were crystallized from a 25:75 acetone/petroleum ether (60° to 110° C. fraction) containing 0.0038 g/ml of monomer by reducing the temperature from 56° C. to room temperature at a rate of 1.2° C./hr. The crystals turned blue upon exposure to daylight. Upon exposure to 15 Mrad of γ-radiation from a $^{60}$Co source, the crystals turned metallic green.

In separate runs, 0.5 g samples of the foregoing monomer crystals were subjected to selected dosages of γ-radiation so as to polymerize the monomer. The irradiated mass of each run was extracted with methanol to remove the non-polymerized monomer, thereby yielding the data summarized in Table IV below.

TABLE IV

| | Radiation Dosage (Mrad) | | | | |
|---|---|---|---|---|---|
| | 1 | 5 | 25 | 50 | 100 |
| Polymer Conversion (Wt % of irradiated sample polymerized) | 33 | 50 | 61 | 68 | 74 |

The polymer was characterized as follows:
(1) IR (KBr) 3320 cm$^{-1}$ (N—H stretching), 1695 cm$^{-1}$ (C=O), 1545 cm$^{-1}$ (N—H bending), 1270 cm$^{-1}$ (C—O—C).

(2) Raman $\nu_{C=C}$ at 1453 cm$^{-1}$, $\nu_{C\equiv C}$ at 2073 cm$^{-1}$.

The as-polymerized material consisted of monoclinic single crystals with space group $P_{2_1/c}$.

EXAMPLE 9

Preparation of poly-4,6-decadiyne-1,10-diol-bisethylurethane

Following the procedure set forth in Example 1, 14.3 g (0.086 mole) of 4,6-decadiyne-1,10-diol was reacted with 21.9 g (0.31 mole) of ethyl isocyanate in the presence of 3 ml of triethylamine, 0.15 g of dibutyltin-di-2-ethylhexanoate and 150 ml of tetrahydrofuran. After a period of approximately 1 hr of continuous stirring of the reaction mixture, 500 ml of heptane was added to the reaction mixture and the resulting mixture heated to a temperature of about 70° C. to remove the excess isocyanate. A precipitate formed, which was collected by filtration and washed with heptane, resulting in 24.3 g (92% yield) of monomer crystals (melting point 115.0° to 116.9° C.).

Crystalline needles 2.5 cm long were easily obtained from a hot 33:67 acetone/petroleum ether (60° to 100° C. fraction) solution containing 0.005 g/ml of monomer by reducing the temperature from 56° C. to room temperature at a rate of 1.2° C./hr.

The monomer crystals were characterized as follows:
(1) $^1$H nmr (CDCl$_3$/TMS) δ 4.8 (s, N—H), 4,2 (t, CH$_2$—O), 3.2 (m, CH$_2$—N), 2.3 (t, CH$_2$—C≡C), 1.8 (quintet C—CH$_2$—C), 1.1 (t, CH$_3$—C—N).

(2) IR (CHCl$_3$) 3460 cm$^{-1}$ (N—H stretching), 1720 cm$^{-1}$ (C=O), 1520 cm$^{-1}$ (N—H bending), 1235 cm$^{-1}$ (C—O—C).

The crystals turned blue upon exposure to daylight; upon exposure to 15 Mrad of γ-radiation from a $^{60}$Co source, the monomer crystals turned metallic green.

In separate runs, 0.5 g samples of the foregoing monomer crystals were exposed to selected dosages of γ-radiation to polymerize the monomer. Extraction of non-polymerized monomer with methanol resulted in the data summarized in Table V:

TABLE V

| | Radiation Dosage (Mrads) | | | | |
|---|---|---|---|---|---|
| | 1 | 5 | 25 | 50 | 100 |
| Polymer Conversion (Wt % of irradiated sample polymerized) | 31 | 49 | 59 | 71 | 78 |

The poly-4,6-decadiyne-1,12-diol-bisethylurethane was characterized as follows:
(1) IR (KBr) 3320 cm$^{-1}$ (N—H stretching), 1690 cm$^{-1}$ (C=C), 1540 cm$^{-1}$(N—H bending), 1265 cm$^{-1}$ (C—O—C).

(2) Raman $\nu_{C=C}$ at 1455 cm$^{-1}$, $\nu_{C\equiv C}$ at 2078 cm$^{-1}$.

EXAMPLE 10

Preparation of poly-4,6-decadiyne-1,10-diol-bisphenylurethane

Following the procedure set forth in Example 1, 11.5 g (0.069 mole) of 4,6-decadiyne-1,10-diol was reacted with 48.2 g (0.405 mole) of phenyl isocyanate in the presence of 2.5 ml of triethylamine, 0.15 g of dibutyltin-di-2-ethylhexanoate and 150 ml of tetrahydrofuran. After continuous stirring of the reaction mixture at a temperature of 50° C. for a period of approximately 1 hr, 900 ml of heptane warmed to a temperature of 50° C. was added to the reaction mixture. The resulting precipitate was collected by filtration and washed with heptane, resulting in 24.4 g (87% yield) of solid monomer (melting point 123° to 125° C.).

Needles 50 mm long were crystallized from a hot 62:38 acetone/water solution containing 0.008 g/ml of monomer by reducing the temperature at a rate of 1.2° C./hr from 67° C. to room temperature.

The monomer crystals obtained were characterized as follows:

(1) $^1$H nmr (CDCl$_3$/TMS) $\delta$ 7.4 (m, Ar—H plus NH), 4.3 (t, CH$_2$—O), 3.4 (t, CH$_2$—C≡C), 1.8 (quintet, C—CH$_2$C).

(2) IR (KBr) 3310 cm$^{-1}$ (N—H stretching), 1600 cm$^{-1}$ (Ar C=C stretching), 1700 cm$^{-1}$ (C=O), 1530 cm$^{-1}$ (N—H bending).

The crystals turned blue upon exposure to daylight; upon exposure to 14 Mrad of $\gamma$-radiation from a $^{60}$Co source, the needles turned metallic green.

Clear crystalline platelets measuring up to 10 mm long by 10 mm wide by 1.5 mm thick were formed by dissolving 0.002 g/ml of monomer in hot xylene and allowing to evaporate slowly. The crystals turned blue upon exposure to daylight; upon exposure to 15 Mrad of $\gamma$-radiation from a $^{60}$Co source, the platelets turned metallic gold.

X-ray diffraction measurements indicated that both the needle-like and the plate-like polymer crystals had the same monoclinic structure, and that both had similarly high structural perfection.

Metallic-appearing films of the monomer were produced by dissolving 0.003 g/ml of irradiated monomer (15 Mrad) in hot dimethylformamide. Evaporation of the solvent over heat left a green metallic film which was strong and flexible.

In separate runs, 0.5 g samples of the above monomer crystals were exposed to selected dosages of $\gamma$-radiation to polymerize the monomer. Extraction of non-polymerized monomer with methanol resulted in the data summarized in Table VI:

TABLE VI

|  | Radiation Dosage (Mrad) | | | | |
| --- | --- | --- | --- | --- | --- |
|  | 1 | 5 | 25 | 50 | 100 |
| Polymer Conversion (Wt % of irradiated sample polymerized) | 30 | 55 | 65 | 75 | 76 |

The poly-4,6-decadiyne-1,10-diol-bisphenyluretane obtained was characterized by Raman $\nu_{C=C}$ at 1455 cm$^{-1}$ and $\nu_{C\equiv C}$ at 2065 cm$^{-1}$.

EXAMPLE 11

Preparation of poly-4,6-decadiyne-1,10-diol-bis-$\alpha$-naphthylurethane

Following the procedure of Example 1, 2.2 g (0.0133 mole) of 4,6-decadiyne-1,10-diol was reacted with 8.45 g (0.07 mole) of $\alpha$-naphthylisocyanate in the presence of 2 ml of triethylamine, 0.1 g of dibutyltin-di-2-ethylhexanoate and 74 ml of tetrahydrofuran. After 1 hr of continuous stirring, 400 ml of heptane was added, and the resulting precipitate was collected and washed with heptane, providing 5.4 g (81% yield) of the desired monomer as a white solid (melting point 157.2° to 161.8° C.).

Fibrous crystals 4 mm long were formed from a hot 64:36 dioxane/water solution containing 0.0028 g/ml of monomer by reducing the temperature from 56° C. to room temperature at a rate of 1.2° C./hr.

The crystals turned pink in daylight; upon exposure to 50 Mrad of $\gamma$-radiation from $^{60}$Co source, the monomer crystals turned a brilliant purple color. The irradiated crystals were largely insoluble in acetone.

A sample of the above monomer was also crystallized from a 90:10 dioxane/water solvent mixture, and the resulting fibrous crystals were polymerized by exposure to 100 Mrad $\gamma$-radiation, thereby producing an irradiated mass having a brilliant purple color.

EXAMPLE 12

Preparation of poly-5,7-dodecadiyne-1,12-diol-bismethylurethane

Following the procedure of Example 1, 20.0 g (0.103 mole) of 5,7-dodecadiyne-1,12-diol was reacted with 23.4 g (0.41 mole) of methyl isocyanate in the presence of 2 ml of triethylamine, 0.2 g of dibutyltin-di-2-ethylhexanoate and 150 ml of tetrahydrofuran. After stirring the reaction mixture for a period of approximately 2 hr at room temperature, about 500 ml of heptane was added to the reaction mixture. The resulting precipitate was collected by filtration and washed with heptane, resulting in 31.1 g (98% yield) of solid (melting point 141.8° to 143.1° C.).

Irregular thin platelets 3 mm in size were crystallized from a hot 45:55 ethanol/water solution containing 0.0036 g/ml of monomer by reducing the temperature from 56° C. to room temperature at a rate of 1.2° C./hr.

The crystals turned blue upon exposure to daylight; upon exposure to 15 Mrad of $\gamma$-radiation from a $^{60}$Co source at a rate of 1 Mrad/hr, the monomer crystals turned metallic green.

The monomer crystals were characterized as follows:
IR (CHCl$_3$) 3470 cm$^{-1}$ (N—H stretching), 1720 cm$^{-1}$ (C=O), 1520 cm$^{-1}$ (N—H bending), 1240 cm$^{-1}$ (C—O—C).

In separate runs, 0.5 g samples of monomer crystals obtained as above were subjected to selected dosages of $\gamma$-radiation to polymerize the monomer. The resulting irradiated mass in each run was extracted with methanol to remove non-polymerized monomer. The data obtained are summarized in Table VII below:

TABLE VII

|  | Radiation Dosage (Mrad) | | | | |
| --- | --- | --- | --- | --- | --- |
|  | 1 | 5 | 25 | 50 | 100 |
| Polymer Conversion (Wt % of irradiated | 44 | 69 | 79 | 82 | 84 |

TABLE VII-continued

| | Radiation Dosage (Mrad) | | | | |
|---|---|---|---|---|---|
| | 1 | 5 | 25 | 50 | 100 |
| sample polymerized) | | | | | |

The poly-5,7-dodecadiyne-1,12-diol-bismethylurethane obtained was characterized as follows:

(1) IR (KBr) 3340 cm$^{-1}$ (N—H stretching), 1695 cm$^{-1}$ (C=O), 1550 cm$^{-1}$ (N—H bending), 1270 cm$^{-1}$ (C—O—C).

(2) Raman $v_{C=C}$ at 1458 cm$^{-1}$, $v_{C\equiv C}$ at 2085 cm$^{-1}$.

EXAMPLE 13

Preparation of poly-5,7-dodecadiyne-1,12-diol-bisethylurethane)

Following the procedure set forth in Example 1, 20.0 g (0.103 mole) of 5,7-dodecadiyne-1,12-diol was reacted with 29.1 g (0.41 mole) of ethyl isocyanate in the presence of 2 ml of triethylamine and 0.1 g of dibutyltin-di-2-ethylhexanoate in 150 ml of tetrahydrofuran. After a period of about 2 hr of continuous stirring at room temperature, 400 ml of heptane was added to the reaction mixture. The resulting precipitate was collected by filtration, washed with heptane, and dried, resulting in 34.4 g (99% yield) of solid monomer (melting point 118.3° to 121.3° C.).

Thin flat regular platelets 5 mm by 1 mm were crystallized from a hot 15:85 dioxane/water solution containing 0.003 g/ml of monomer by reducing the temperature from 56° C. to room temperature at a rate of 1.2° C./hr.

The crystals turned purple upon exposure to daylight; upon exposure to 15 Mrad of γ-radiation from a $^{60}$Co source at a rate of 1 Mrad/hr, the monomer crystals turned metallic green.

In separate runs, 0.5 g samples of the monomer obtained above were subjected to selected dosages of γ-radiation to polymerize the monomer. The irradiated mass obtained in each run was extracted with methanol to remove the non-polymerized monomer, resulting in the data summarized in Table VIII below:

TABLE VIII

| | Radiation Dosage (Mrad) | | | | |
|---|---|---|---|---|---|
| | 1 | 5 | 25 | 50 | 100 |
| Polymer Conversion (wt % of irradiated sample polymerized | 46 | 57 | 72 | 77 | 79 |

The poly-5,7-dodecadiyne-1,12-diol-bisethylurethane obtained was characterized by Raman $v_{C=C}$ at 1454 cm$^{-1}$ and $v_{C\equiv C}$ at 2078 cm$^{-1}$.

X-ray diffraction studies indicated that the as-polymerized materials consisted of monoclinic crystals having high structural perfection.

EXAMPLE 14

Preparation of poly-5,7-dodecadiyne-1,12-diol-bisphenylurethane

Following the procedure of Example 1, 17.6 g (0.091 mole) of 5,7-dodecadiyne-1,12-diol was reacted with 65.7 g (0.55 mole) of phenyl isocyanate in the presence of 2.5 ml of triethylamine, 0.2 g of dibutyltin-di-2-ethylhexanoate and 200 ml of tetrahydrofuran. After a reaction period of approximately 2 hr, 850 ml of heptane warmed to a temperature of 45° C. was added to the reaction mixture. The resulting precipitate was collected by filtration, washed with heptane and dried, resulting in 38.4 g (98% yield) of solid monomer (melting point 148.8° to 150.1° C.).

Large regular plates up to 14 mm by 5 mm by 1.5 mm were crystallized from a 50:50 acetone/ethylacetate solution containing 0.008 g/ml of monomer by allowing the solvent to evaporate slowly at room temperature. The crystals were clear and slowly turned light purple upon exposure to daylight.

The monomer crystals were characterized as follows:
IR (CHCl$_3$) 3440 cm$^{-1}$ (N—H stretching), 1730 cm$^{-1}$ (C=O), 1600 cm$^{-1}$ (Ar C=C stretching), 1520 cm$^{-1}$ (N—H bending).

Upon exposure to 14 Mrad of γ-radiation from a $^{60}$Co source, the crystals turned brown-black. Upon exposure to 50 Mrad, the crystals turned amber to green, depending upon the angle of observation. Both samples evidenced very lustrous surfaces and were optically clear.

About 10 g of monomer obtained as above was recrystallized from 300 ml of ethyl acetate, resulting in colorless needle-like crystals. Exposure of the above monomer crystals in separate runs to 14 Mrad and 50 Mrad of γ-radiation, respectively, resulted in dark red polymer crystals which were highly dichroic. The poly-5,7-dodecadiyne-1,12-diol-bisphenylurethane was characterized as follows:

(1) IR (KBr) 3320 cm$^{-1}$ (N—H stretching), 1700 cm$^{-1}$ (C=O), 1600 cm$^{-1}$ (Ar C=C stretching), 1535 cm$^{-1}$ (N—H bending), 1230 cm$^-$(C—O—C).

(2) Raman $v_{C=C}$ at 1458 cm$^{-1}$, $v_{C\equiv C}$ at 2085 cm$^{-1}$.

X-ray diffraction studies indicated that the as-polymerized monomer crystals were monoclinic single crystals having high structural perfection.

EXAMPLE 15

Melt processing of poly-5,7-dodecadiyne-1,12-diol-bisethylurethane 1.0 g of 15 Mrad γ-irradiated material from Example 13 that had previously been extracted with hot acetone and dried was placed between two aluminum plates. The assembly was then set between the plattens of a hydraulic press and pressed at 10 tons for 2.5 min at 240° C. A shiny dark red film remained that was pliable and strong.

EXAMPLE 16

Solution casting of poly-4,6-decadiyne-1,10-diol-bisphenylurethane 1.0 g of 15 Mrad γ-irradiated material from EXAMPLE 10 that had previously been extracted with hot acetone and dried was dissolved in 300 ml of hot dimethylformamide. After hot filtration, the solution was poured into a crystallizing dish. The solvent was evaporated slowly from the viscous solution at a temperature of between 65° to 75° C. Upon complete evaporation of the solvent, a metallic green film of low crystallinity remained that was pliable and strong.

EXAMPLE 17

Czochralski growth technique of a monomer

A single crystal boule of 4,6-decadiyne-1,10-diol-bisethylurethane was melt grown by the Czochralksi technique as follows. A 25 mm by 250 mm test tube was partially immersed in a Haake constant temperature oil bath set at 155° C. 10 g of 4,6-decadiyne-1,10-diol-bisethylurethane monomer prepared as in Example 9 was added to the test tube. A stream of nitrogen gas was introduced into the upper portion of the test tube. After melting of the monomer, the temperature of the oil bath was reduced to 134° C., and the upper portion of the test tube was fitted with a busing which contained openings for nitrogen inlet and outlet. A third opening, in the center of the bushing, was used to pass a ceramic rod, 0.125 inch in diameter, for pulling the boule from the melt. A seed crystal of the monomer was attached to one end of the rod and lowered into the melt. The other end of the rod was attached to conventional crystal pulling apparatus. The rod was rotated at 20 rpm and withdrawn from the melt at a rate of 6 mm/hr. A single crystal boule of the monomer was obtained about 8 inches in length, with an average diameter of 0.13 inch. The boule was a clear, light tan color. Upon exposure to 15 Mrad of γ-radiation, the boule turned metallic green.

Since various changes and modifications may be made in carrying out the invention without departing from the spirit thereof, it is intended that all matter contained in the above description shall be interpreted as illustrative only, the invention being limited solely by the scope of the appended claims.

What is claimed is:

1. A liquid phase processable crystalline diacetylene polymer obtains by 1,4-addition solid state polymerization of a diacetylene monomer having a formula of the group consisting of $[R_1NHOCO(CH_2)_3-C\equiv C-]_2$ and $[R_2NHOCO(CH_2)_4-C\equiv C-]_2$; wherein $R_1$ is of the group consisting of $CH_3CH_2$, $C_6H_5$, and $C_{10}H_7$ and $R_2$ is of the group consisting of $CH_3$, $CH_3CH_2$, and $C_6H_5$.

2. The crystalline diacetylene polymer obtained according to claim 1 in which the diacetylene monomer is $CH_3CH_2NHOCO(CH_2)_3-C\equiv C-C\equiv C-(CH_2)_3OCONHCH_2CH_3$.

3. The crystalline diacetylene polymer obtained according to claim 1 in which the diacetylene monomer is $C_6H_5NHOCO(CH_2)_3-C\equiv C-C\equiv C-(CH_2)_3OCONHC_6H_5$.

4. The crystalline diacetylene polymer obtained according to claim 1 in which the diacetylene monomer is $C_{10}H_7NHOCO(CH_2)_3-C\equiv C-C\equiv C-(CH_2)_3OCONHC_{10}H_7$.

5. The crystalline diacetylene polymer obtained according to claim 1 in which the diacetylene monomer is $CH_3NHOCO(CH_2)_4-C\equiv C-C\equiv C-(CH_2)_4OCONHCH_3$.

6. The crystalline diacetylene polymer obtained according to claim 1 in which the diacetylene monomer is $CH_3CH_2NHOCO(CH_2)_4-C\equiv C-C\equiv C-(CH_2)_4OCONHCH_2CH_3$.

7. The crystalline diacetylene polymer obtained according to claim 1 in which the diacetylene monomer is $C_6H_5NHOCO(CH_2)_4-C\equiv C-C\equiv C-(CH_2)_4OCONHC_6H_5$.

* * * * *